United States Patent
Shih et al.

(10) Patent No.: US 11,356,420 B2
(45) Date of Patent: Jun. 7, 2022

(54) INTERNET OF THINGS (IOT) GATEWAY FLOW ENGINE OPTIMIZER AND CONFIGURATION DISTRIBUTION

(71) Applicant: International Business Machines Corporation, Armonk, NY (US)

(72) Inventors: Hao-Ting Shih, Taipei (TW); Chih-Hsiung Liu, Taipei (TW); Joey H. Y. Tseng, Taipei (TW); Yi-Hong Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 16/205,270

(22) Filed: Nov. 30, 2018

(65) Prior Publication Data

US 2020/0177545 A1 Jun. 4, 2020

(51) Int. Cl.
*H04L 9/40* (2022.01)
*H04L 67/12* (2022.01)
*H04L 67/10* (2022.01)

(52) U.S. Cl.
CPC ........ *H04L 63/029* (2013.01); *H04L 63/0218* (2013.01); *H04L 67/12* (2013.01); *H04L 67/10* (2013.01)

(58) Field of Classification Search
CPC ... H04L 63/029; H04L 63/0218; H04L 67/12; H04L 67/10; H04L 63/0263; H04L 63/0428; H04L 67/288; H04W 4/70
See application file for complete search history.

(56) References Cited

U.S. PATENT DOCUMENTS

| | | | |
|---|---|---|---|
| 8,423,950 B2 * | 4/2013 | Dettinger | H04L 67/32 717/104 |
| 9,313,299 B2 | 4/2016 | Carney | |
| 2014/0201255 A1 * | 7/2014 | Baek | H04L 67/06 709/201 |
| 2016/0379165 A1 * | 12/2016 | Moakley | G06Q 10/0833 705/333 |
| 2017/0060574 A1 | 3/2017 | Malladi | |
| 2017/0201585 A1 | 7/2017 | Doraiswamy | |
| 2018/0210436 A1 * | 7/2018 | Burd | G05B 19/41885 |
| 2018/0232031 A1 * | 8/2018 | Swierk | H04L 43/08 |
| 2018/0253569 A1 * | 9/2018 | Swierk | G06F 21/554 |
| 2019/0014048 A1 * | 1/2019 | Krishna Singuru | H04L 12/66 |
| 2019/0356542 A1 * | 11/2019 | Chamarajnager | H04L 41/046 |

OTHER PUBLICATIONS

Lasse Pajunen et al., "Developing Workflow Engine for Mobile Devices," 2007 IEEE, pp. 279-286. (Year: 2007).*

(Continued)

*Primary Examiner* — Luu T Pham
*Assistant Examiner* — Canh Le
(74) *Attorney, Agent, or Firm* — Stephen R. Yoder

(57) ABSTRACT

A single Internet of Things (IoT) gateway flow computer (either on a gateway machine or a non-gateway machine) that controls flow through both of the following types of gateways: (i) cloud gateways; and (ii) edge gateways. Both overall configuration and sub-configuration are automatically and dynamically controlled by the single, system-wide IoT gateway flow computer.

12 Claims, 9 Drawing Sheets

(56) References Cited

OTHER PUBLICATIONS

Vishwapathi Rao et al., "Software Defined Networks: Redefining the Future of Internet in IoT and Cloud era," 2014 IEEE, pp. 296-301. (Year: 2014).*

Sharma et al., "Live Data Analytics with Collaborative Edge and Cloud Processing in Wireless IoT Networks", accepted Feb. 27, 2017, date of publication Mar. 20, 2017, date of current version Apr. 24, 2017, Digital Object Identifier 10.1109/ACCESS.2017.2682640, vol. 5, 2017, IEEEAccess, pp. 4621-4635.

* cited by examiner

INTERNET OF THINGS (IOT) GATEWAY FLOW ENGINE OPTIMIZER AND CONFIGURATION DISTRIBUTION

BACKGROUND

The present invention relates generally to the field of configuration of work flows through gateways, and more particularly configuring overall work flow and sub-configuration of work flows through IoT ("Internet of Things") gateways.

Edge computing is known. Edge computing is a distributed computing paradigm in which computation is typically largely, or completely, performed on distributed device nodes known as "smart devices" or "edge devices" as opposed to primarily taking place in a centralized cloud environment. "Edge" here refers to the geographic distribution of computing nodes in the network as IoT devices, which are at the "edge" of an enterprise, local area or other network. Edge computing can help provide server resources, data analysis and artificial intelligence ("ambient intelligence") closer to data collection sources and systems such as smart sensors and smart actuators.

An edge gateway (as that term is used herein) is defined as a piece of networking hardware used in telecommunications for telecommunications networks that allows data to flow from a set of edge computing device(s) to a discrete network. Edge gateways are distinct from routers or switches in that they typically communicate using more than one protocol and can operate at any of the seven (7) layers of the OSI (open systems interconnection) model. The term "edge gateway" also may refer to a computer or computer program configured to perform the tasks of a gateway, such as a default gateway or router.

A "cloud" is herein used to mean a discrete network of computing devices that exists primary to provide computing services, such as use of virtual machine(s), container(s) and their underlying physical computing resources.

A cloud gateway is any physical device and/or code running on a physical device that communicates data between two discrete clouds.

Today we have millions of devices are connected to cloud, and tens of thousands of sensor data are transmitted to cloud for real-time monitoring and analysis. As a result, IoT Gateway plays an important role in various scenario that help enterprise to manage these data transmission. Cloud-based flow-engine (for example, NodeRed) has become de facto way to compose IoT data flow in a visual way. These flow engines provide a rich set of logical/function components that allow developers to easily bridge multiple systems together by chaining the data flow. Data could be generated by sensors, applications, or any external services.

SUMMARY

According to an aspect of the present invention, there is a method, computer program product and/or system that performs the following operations (not necessarily in the following order): (i) deploying a hybrid Internet of Things (IoT) gateway architecture including a plurality of cloud gateways and a plurality of edge gateways; (ii) configuring, by a user and through a centralized/unified flow engine interface implemented on a centralized IoT gateway flow computer, a set of overall workflow(s) for the hybrid IoT gateway architecture; (iii) assigning, dynamically and automatically, a set of sub-configuration(s); and (iv) deploying, dynamically and automatically, the set of sub-configuration(s) to the plurality of cloud gateways and the plurality of edge gateways.

DETAILED DESCRIPTION

Figure 1:
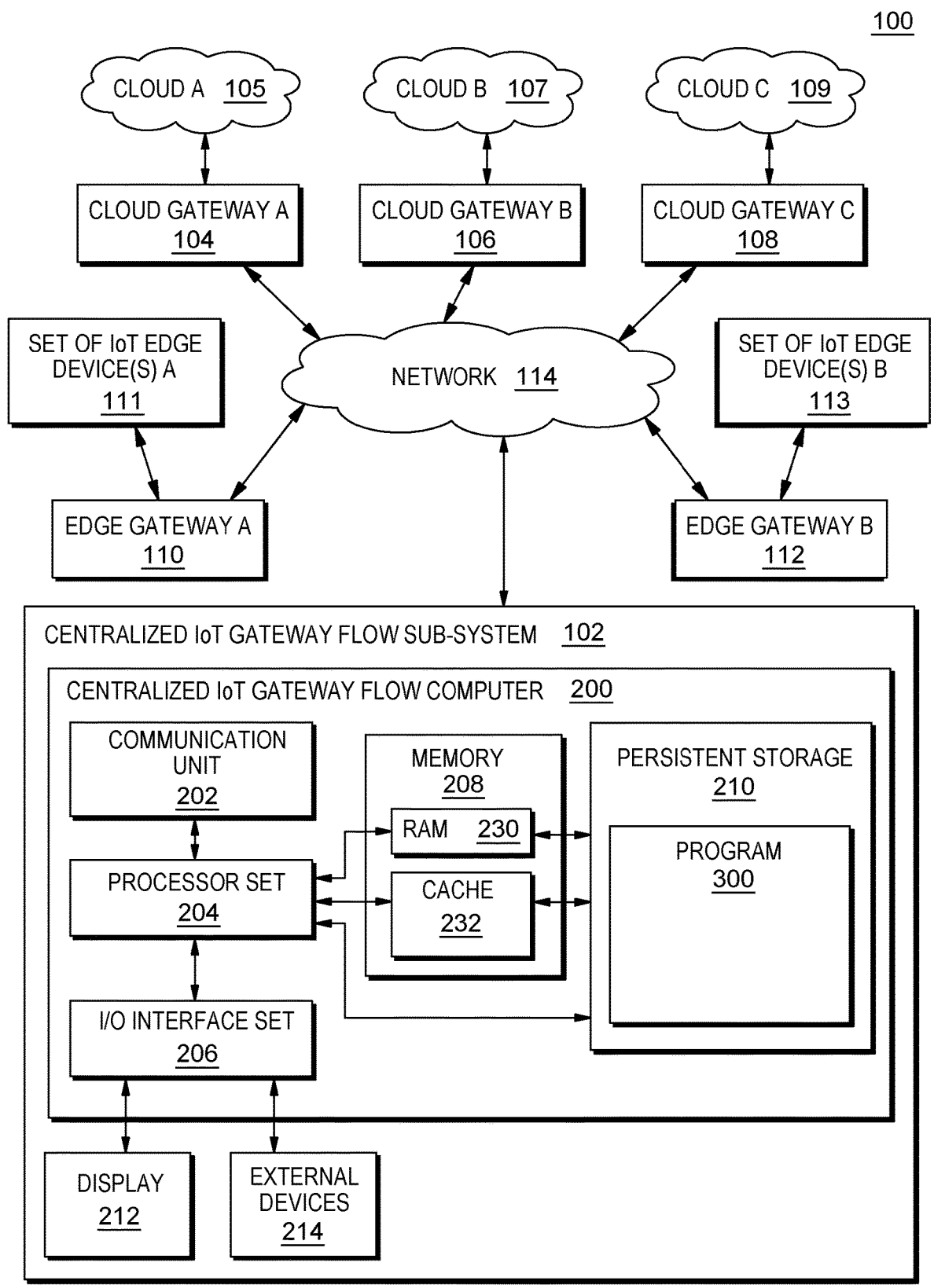
FIG. 1 is a block diagram view of a first embodiment of a system according to the present invention.

Some embodiments of the present invention are directed to a single Internet of Things (IoT) gateway flow computer (either on a gateway machine or a non-gateway machine) that controls flow through both of the following types of gateways: (i) cloud gateways; and (ii) edge gateways. Both overall configuration and sub-configuration are automatically and dynamically controlled by the single, system-wide IoT gateway flow computer. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: centralized IoT gateway flow sub-system 102; cloud gateway A 104; cloud A 105; cloud gateway B 106; cloud B 107; cloud gateway C 108; cloud C 109; edge gateway A 110; set of IoT edge device(s) A 111; edge gateway B 112; set of IoT edge device(s) B 113; communication network 114; centralized IoT gateway flow computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
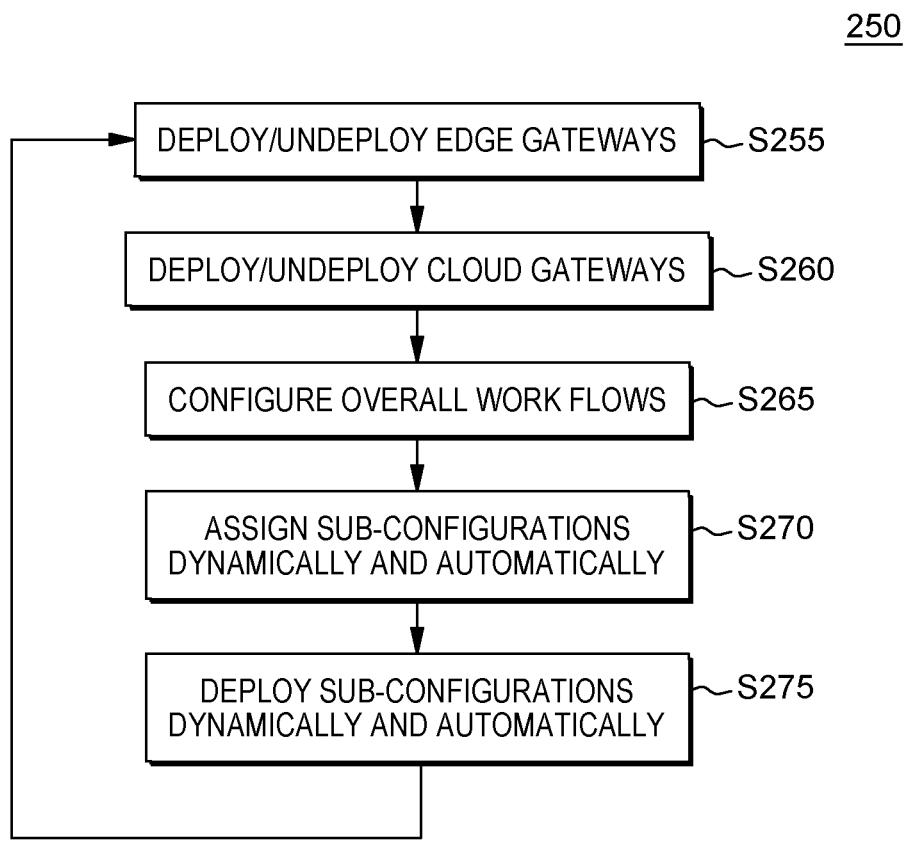
FIG. 2 is a flowchart showing a first embodiment method performed, at least in part, by the first embodiment system.
Figure 3:
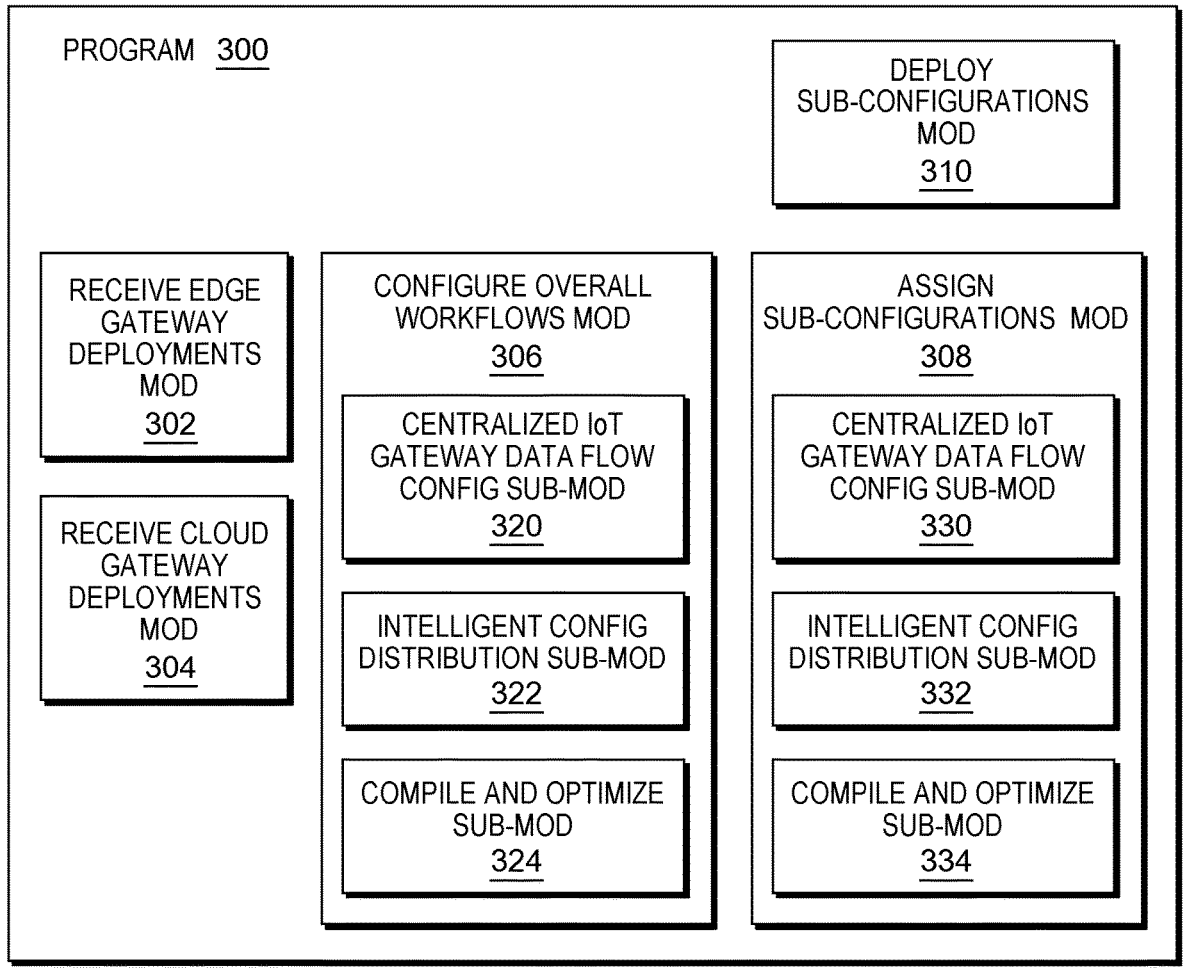
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where the following gateways are deployed: edge gateway A 110 and edge gateway B 112 (see FIG. 1). The deployment of these two edge gateways determines the initial edge gateway topology for networked computers system 100. At operation S255, the identities, physical locations and logical locations of these deployed edge gateways are sent to receive edge gateway deployments module ("mod") 302.

Processing proceeds to operation S260, where the following gateways are deployed: cloud gateway A 104; cloud gateway B 106; and cloud gateway C 108 (see FIG. 1). The deployment of these three (3) cloud gateways determines the initial cloud gateway topology for networked computers system 100. At operation S260, the identities, physical locations and logical locations of these deployed cloud gateways are sent to receive cloud gateway deployments module ("mod") 304. Because program 300 has now received the initial deployment status for both the edge gateways and the cloud gateways, program 300 now has information on the entire gateway topology for networked computers system 100.

Figure 4:
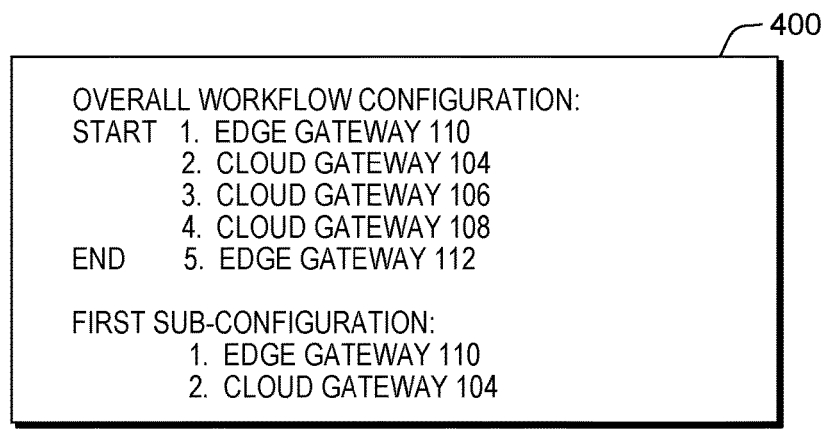
FIG. 4 is a screenshot view generated by the first embodiment system.

Processing proceeds to operation S265, where configure overall workflows mod 306 configures overall work flows for and/or through networked computers system 100. This configuration of overall work flows involves three (3) sub-operations as follows: (i) centralized IoT gateway data flow configuration sub-mod 320 of configure overall work flows mod 306 configures data flow for both the cloud gateways and the edge gateways, systemwide; (ii) intelligent configuration sub-mod 322 of configure overall workflows mod 306 provides intelligent configuration distribution for both the cloud gateways and the edge gateways, systemwide; and (iii) compile and optimize sub-mod 324 of configure overall workflows mod 306 compiles and optimizes the overall work flow configuration for both the cloud gateways and the edge gateways, systemwide. The overall work flow configuration in this example is shown in the top portion of screenshot 400 of FIG. 4.

Processing proceeds to operation S270, where assign sub-configurations mod 308 automatically assigns sub-configurations for use in networked computers system 100. This configuration of sub-configurations involves three (3) sub-operations as follows: (i) centralized IoT gateway data flow configuration sub-mod 330 of assign sub-configurations mod 308 configures data flow for sub-configurations; (ii) intelligent configuration sub-mod 332 of assign sub-configurations mod 308 provides intelligent configuration distribution for the sub-configurations; and (iii) compile and optimize sub-mod 334 of assign sub-configurations mod 308 compiles and optimizes the sub-configurations. An example sub-configuration is shown at the bottom portion of screenshot 400 of FIG. 4.

Processing proceeds to operation S275, where deploy sub-configurations mod 310 deploys the overall work flow configuration and/or the sub-configuration(s) so that these can be used in networked computers system 100. Processing loops back to S255, where new gateways may be added and/or removed from the system. By looping back through operations S255 to S275, the process of optimizing configurations and sub-configurations involving both cloud gateways and edge gateways is dynamic (that is, performed intermittently and without substantial human intervention).

III. Further Comments and/or Embodiments

Some embodiments of the present invention may recognize the following facts, potential problems and/or potential areas for improvement with respect to the current state of the art: (i) unstable routing and the underestimated throughput could lead the cloud based IoT gateway to become the bottleneck of the overall performance; (ii) today there is no configuration tools of cloud based IoT Gateway services that can blueprint the integration services of cloud gateway and edge gateway under the same revision control; (iii) management of IoT Gateways is not easy—in particularly administrator has to explicitly configure both cloud and edge gateway for them to work properly; (iv) flow engines controls the behavior of one runtime instance—they are the aggregator and dispatcher of data flow; (v) however, edge computing and edge analytics is going to be a critical feature of most IoT solutions today, cloud-based flow engines alone can't satisfy most requirements; and/or (vi) in particular, High Availability of edge devices (for example, IoT robot).

Some embodiments of the present invention may recognize the following facts, potential problems and/or potential areas for improvement with respect to the current state of the art: (i) it is possible to intelligently compose and configure services/applications on gateway devices on edge computing platform and cloud computing platform based on resource availability for optimizing data analytics; (ii) it is possible to distribute task(s) among cloud and edge gateways using a central edge computing node to process data associated with events generated by IoT devices; and/or (iii) it is possible to split analytics services on edge computing platform and cloud computing platform based on traffic types, location information, processing delay and transmission overhead in order to achieving the advantages of both cloud and edge computing platforms.

Some embodiments of the present invention recognize the following facts, potential problems and/or potential areas for improvement with respect to the current state of the art: (i) intelligently composes and configures services and/or applications on gateway devices on edge computing platform(s) and cloud computing platform(s) based on resource availability for optimizing data analytics; (ii) distributes tasks among cloud and edge gateways using a central edge computing node to process data associated with events generated by IoT devices; and/or (iii) splits analytics services on edge computing platform(s) and cloud computing platform(s) based on traffic types, location information, processing delay, and transmission overhead in order to achieve the advantages of both cloud and edge computing platforms.

Some embodiments of the present invention may include one, or more, of the following features, characteristics, operations and/or advantages: (i) system and method of IoT gateway flow engine optimizer and configuration distribution; (ii) handles the configuration effort required to manage both cloud and edge gateway when this effort is not trivial; (iii) provides a unified flow control design interface that helps enterprise customers to properly manage their IoT gateways, both on cloud and edge; (iv) a unified IoT Gateway flow design framework that includes both edge gateway and cloud gateway functions; (v) from a user's perspective, it is not required to explicit specify whether a flow should run on cloud or on the edge; and/or (vi) for flows that could be handled by edge gateway locally, the system should be smart enough to assign and deploy the flow to local edge gateway.

Some embodiments of the present invention may include one, or more, of the following features, characteristics, operations and/or advantages: (i) a hybrid IoT gateway architecture; (ii) in this architecture, IoT gateway are deployed both on edges and cloud; (iii) the IoT Gateway provides a flow engine that allows a user to configure, and from user's perspective she doesn't have to concern about whether the configuration will be stored on edge IoT; (iv) gateway or cloud IoT gateway—the flow optimization engine will assign proper configuration to right gateway based on overall topology of the system, as well as High-Availability requirement from a user; (v) centralize IoT gateway data flow configuration and intelligent configuration distribution; and/or (vi) a gateway flow system that will would compile and optimize configuration.

Figure 6:
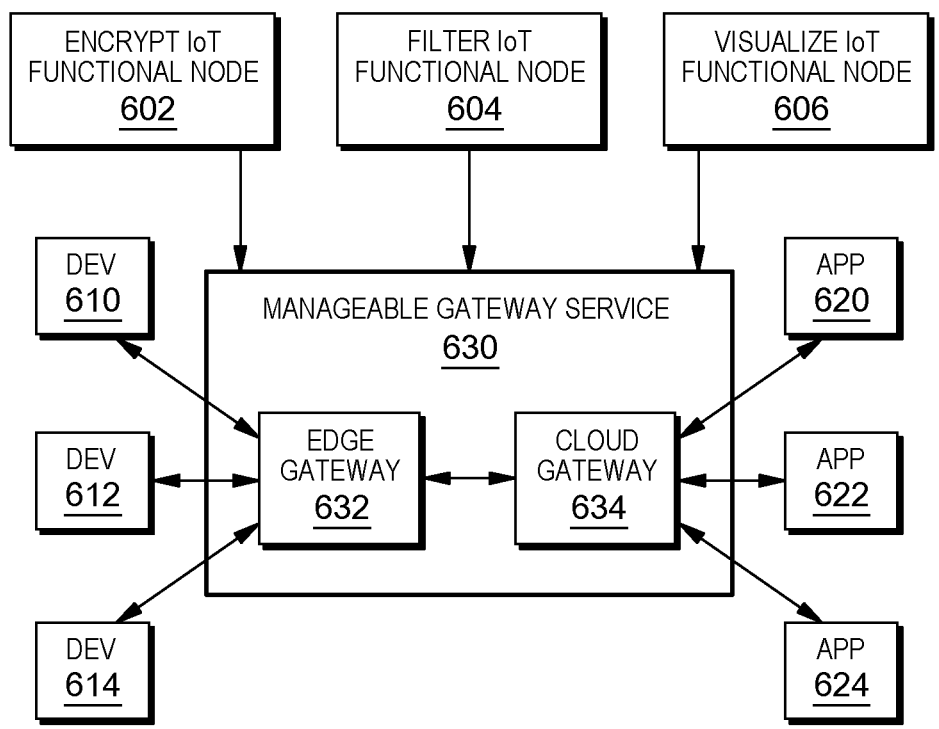
FIG. 6 is a block diagram view of a second embodiment of a system according to the present invention.

Diagram 600 of FIG. 6 shows a manageable gateway service environment that includes: encrypt IoT functional node 602; filter IoT functional node 604; visualize IoT functional node 606; dev devices 610, 612, 614; apps 620, 622, 624; manageable gateway service 630. Manageable gateway service 630 includes: edge gateway 632 and cloud gateway 634.

Figure 7:
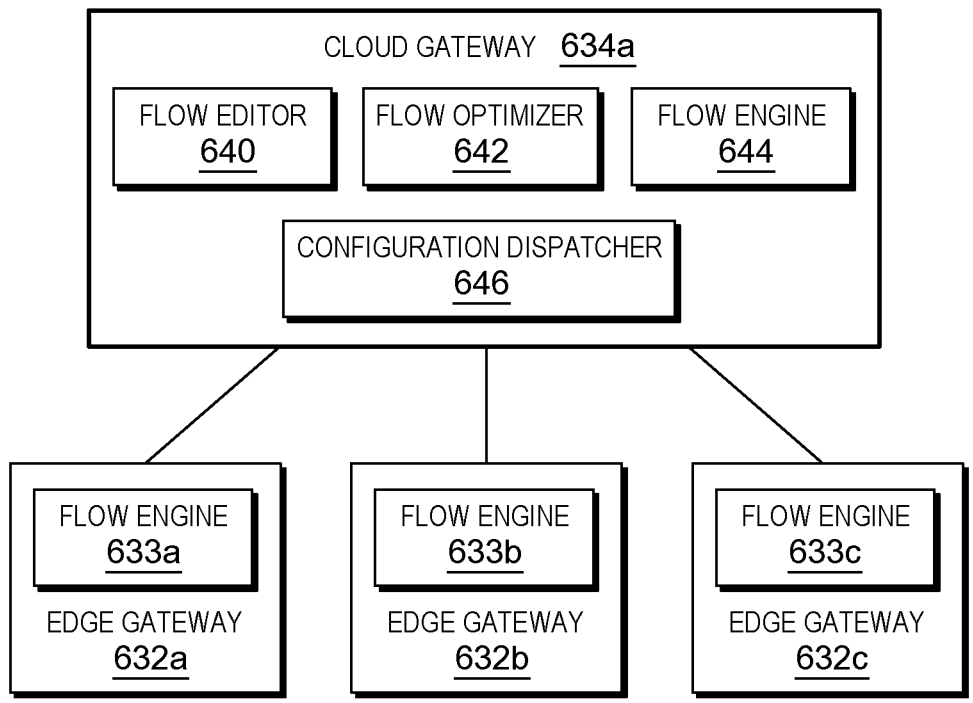
FIG. 7 is a block diagram view of a third embodiment of a system according to the present invention.

Diagram 700 of FIG. 7 shows system architecture according to an embodiment of the present invention, the system architecture including: edge gateways 632a, b, c; and cloud gateway 634a. Cloud gateway 634a includes: flow editor 640; flow optimizer 642; flow engine 644; and configuration dispatcher 646. In the architecture of diagram 700, there is only one flow editor 640 on cloud gateway 634a. When flows are configured, it is optimized by flow optimizer 642, which decides how the flow should be dispatched at which gateway (cloud or edge). After that, the final configurations are dispatched to their respective gateways 632a, b, c and 634a. The flow engine on each gateway 644, 633a, 633b and 633c is responsible for executing the configured flow when data is received at runtime.

Figure 8:
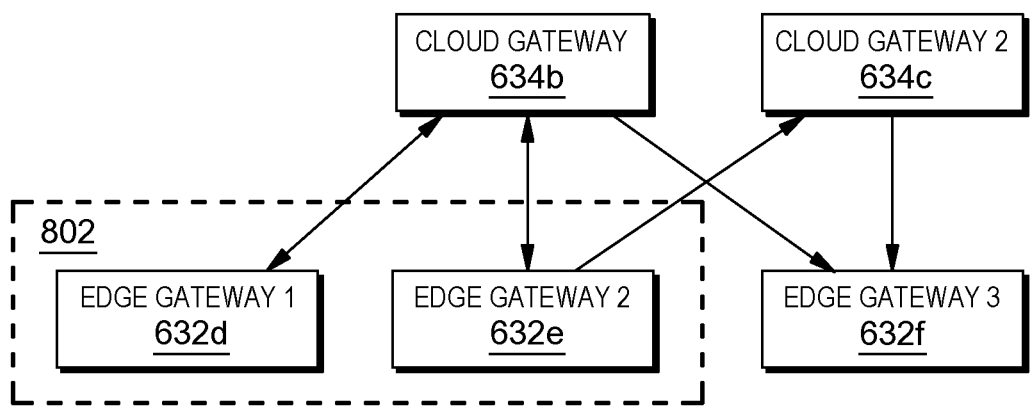
FIG. 8 is a block diagram view of a fourth embodiment of a system according to the present invention.

Diagram 800 of FIG. 8 shows a network topology according to an embodiment of the present invention, the network topology showing: cloud gateways 634b, c; edge gateways 632d, e, f; and edge gateway grouping 802. As shown in diagram 800, edge gateway grouping 802 includes edge gateways 632d and 632e. Alternatively, edge gateway grouping 802 can include any combination of groupings involving edge gateways 632d, e, f.

Figure 10:
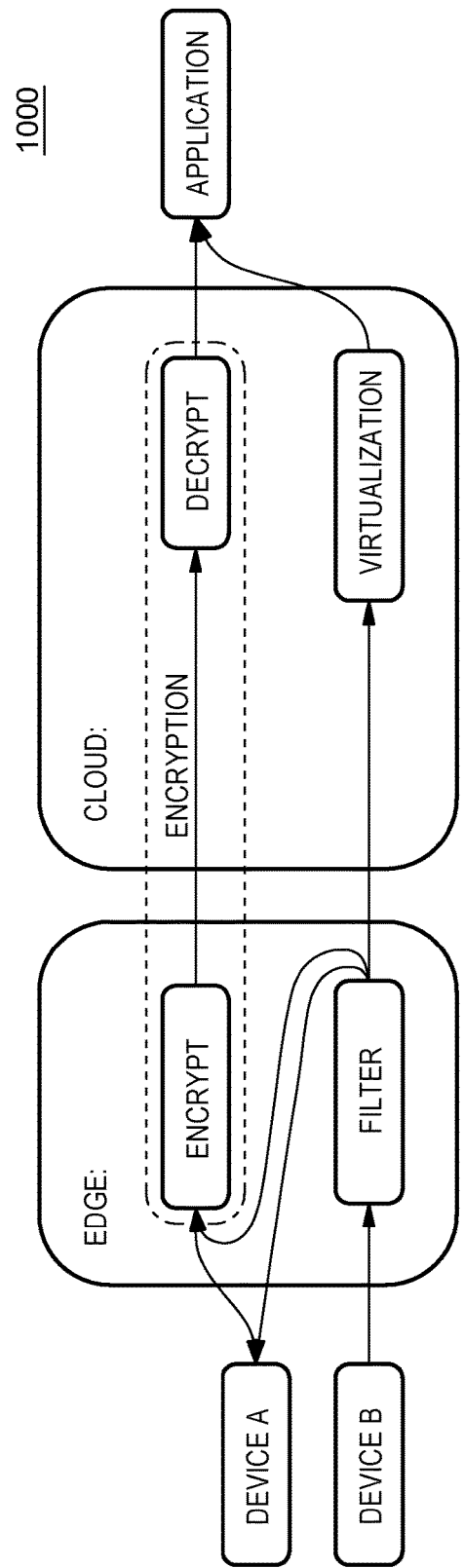
FIG. 10 an optimized distributed flow diagram according to a fourth embodiment of a method according to the present invention.

Optimized distributed flow diagram 1000 of FIG. 10 shows that during deployment stage, the process flow is automatically separated into edge gateway and cloud gateway as follows: (i) the Encryption service is automatically spread into Encrypt and Decrypt services; (ii) when flow proceeds from the filter block to the device A block in FIG. 1000, the flow doesn't need to go to cloud gateway (edge-gateway-only); and (iii) when flow proceeds from the filter block to the device A block in FIG. 1000, desired results can be obtained from the edge gateway immediately.

Some embodiments of the present invention may include one, or more, of the following features, characteristics, operations and/or advantages: (i) a hybrid IoT gateway architecture where IoT gateways can be deployed on different locations (for example, on edges and on cloud); (ii) this architecture provides a centralized/unified flow engine interface that allows users to configure the overall workflows and with the provided flow compiler and flow optimization engine; (iii) sub-configurations will be assigned and deployed dynamically and automatically to the gateways of proper locations based on overall topology of the system; (iv) users do not have to manually break down the overall flow configuration and configure each gateway in different locations accordingly; (v) centralized IoT gateway data flow configuration and intelligent configuration distribution; and/ or (vi) in gateway flow system that will would compile and optimize the configuration.

Figure 5:
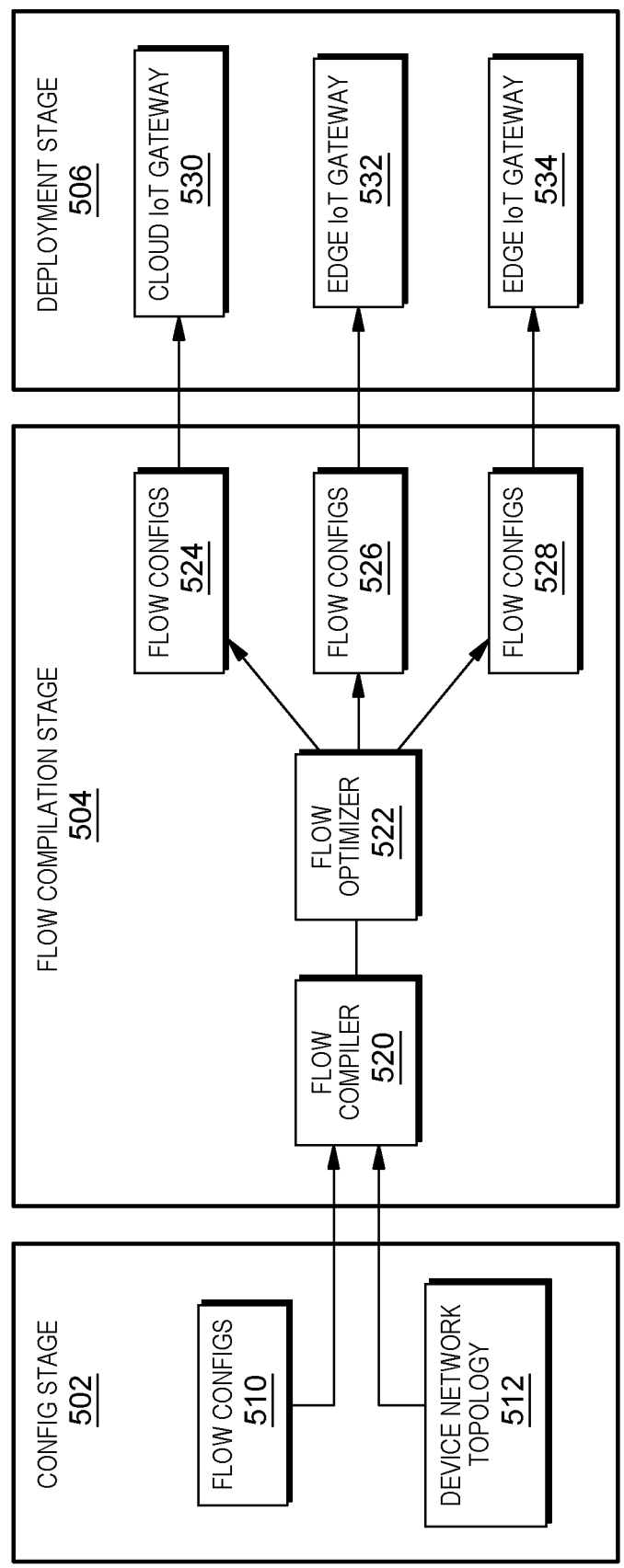
FIG. 5 is flow diagram according to a second embodiment of a method according to the present invention.

Flow chart 500 of FIG. 5 includes: configuration stage operation(s) 502; flow compilation stage operation(s) 504; and deployment stage operations 506. Configuration stage operations 502 includes: flow configurations block 510; and device network topology block 512. Flow compilation stage 504 includes: flow compiler 520; flow optimizer 522; and flow configurations blocks 524, 526, 528. Deployment stage operations 506 include: cloud IoT gateway 530; edge IoT gateway 532; and edge IoT gateway 534. The method of flow chart 500 allows users to configure flow in a centralized place (specifically, a computer (not separately shown) hosting flow compiler 520 and flow optimizer 522). The flow compiler and the flow optimizer generate appropriate configurations for cloud IoT gateway 530, edge IoT gateway 532 and edge IoT gateway 534. Some embodiments of the present invention may provide a special component (flow node) that simplifies configurational complexities for IoT devices.

Figure 9:
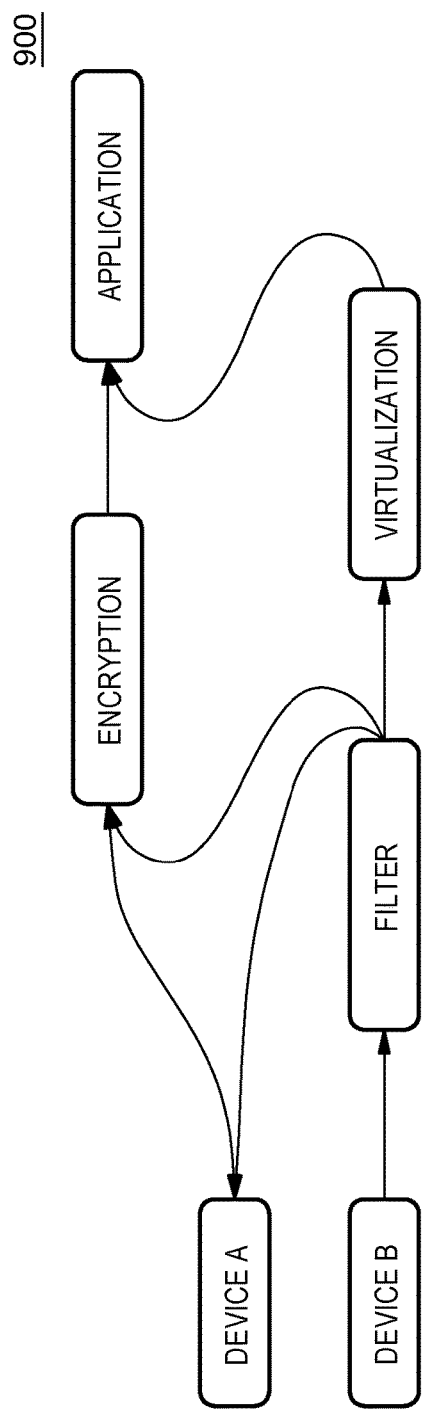
FIG. 9 an original high level flow diagram according to a third embodiment of a method according to the present invention.

Flow diagram 900 of FIG. 9 shows possible flows according to an embodiment of the present invention. For example, let's assume administrator creates a gateway flow on the cloud which is shown by the arrow from the Device B block to the filter block to the Device A block in diagram 900. This arrow means that what is filtered by node "filter" should send the filtered output to Device A from Device B. This flow actually does not need to go to a cloud gateway, so the flow optimizer would maintain this flow on edge gateways and/or edge devices.

Optimized distributed flow diagram 1000 of FIG. 10 shows an optimized distributed flow according to an embodiment of the present invention. In some embodiments of the present invention, implementation of a flow optimization method (as depicted by the optimized distributed flow of FIG. 10) includes the following: (i) a cloud service administrator creates a global service flow with a unified Flow Editor program, which includes three main services: "Filter", "Encryption", and "Virtualization"; (ii) a Flow Optimizer program analyzes these three main services and figures out that the "Encryption" service should be separated into "Encrypt" and "Decrypt" sub-services; (iii) based on the determination that the "Encryption" service should be separated into "Encrypt" and "Decrypt" sub-services, these sub-services are to be deployed to edge and cloud gateways respectively for runtime execution; (iv) Based on the "Encrypt" and "Decrypt" sub-services that were determined above, the Flow Optimizer program generates sub-flows that are optimized to be executed on either edge or cloud (or both) gateways (for example, a given sub-flow (as shown here with respect to flow diagram 1000) that performs a "filter" operation (and having an flow path of Device B to "Filter" to Device A) only needs to be executed on edge gateways, and therefore does not need to be deployed on cloud gateways; (v) a configuration dispatcher deploys the generated sub-flows to edge and cloud gateways accordingly; and (vi) these generated sub-flows will be executed by the local flow engines at runtime.

Figure 11:
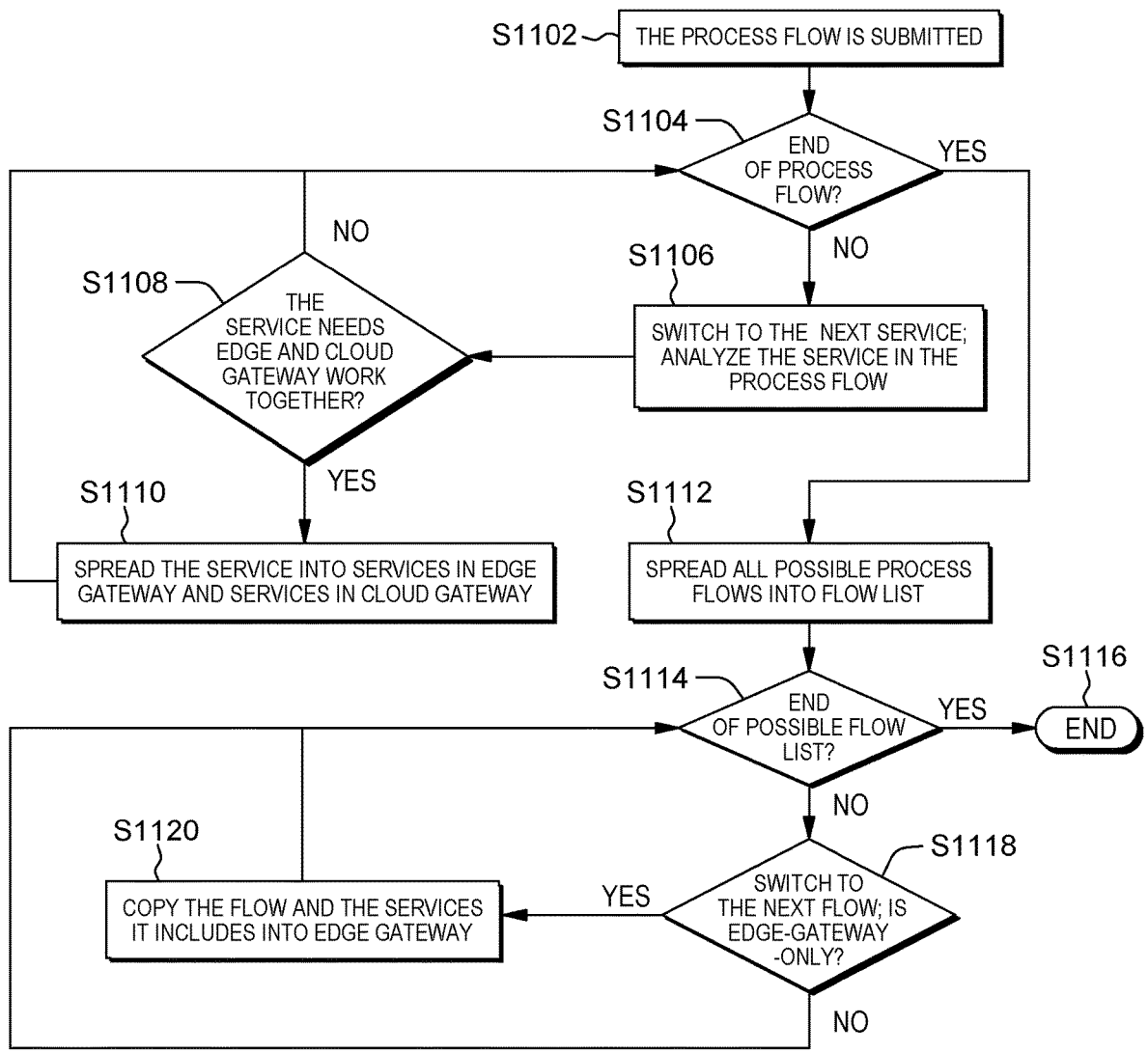
FIG. 11 a flow chart showing a fifth embodiment of a method according to the present invention.

FIG. 11 shows flow chart 1100 which is an embodiment of a method according to the present invention that includes the following operations: S1102; S1104; S1106; S1108; S1110; S1112; S1114; S1116; S1118; and S1120. Process flow among and between these operations is as shown in FIG. 11.

Some embodiments of the present invention may include one, or more, of the following features, characteristics, operations and/or advantages: (i) greatly improves the efficiency and usability of could service flows that involve both the cloud and the edge sides; (ii) IBM solutions like Bluemix and DataPower gateway can benefit from this invention (for example, the Bluemix Secure Gateway Service that can be deployed on both Bluemix cloud and DataPower on-premises gateways); (iii) by using the service configuration process and examining the runtime service policy execution results, it is easy to detect if the core idea of flow service optimization is used; and/or (iv) support dynamic flow service configuration optimization and deployment at configuration/runtime.

Some embodiments of the present invention may include one, or more, of the following features, characteristics and/or advantages: (i) provides a general visual programming environment on the cloud; (ii) generates optimized flow policy based on the device topology and the device capability; (iii) generates and optimizes the overall flow policy; (iv) dynamically and automatically deploys sub-flow policies to other cloud and/or edge nodes based on the device topology and device capability; (v) deploys the overview framework to both the cloud and edge ends; (vi) deploys the framework based on the flow logic, network topology and the type of operations in order to minimize the latency of each flow in the framework; (vii) deploys and configures IoT gateway workflows (such as services and/or operations in the workflow) on edge computing platform(s) and cloud computing platform(s); (viii) utilizes a centralized workflow engine to configure the overall workflow (or all sub-flows) and deploys the sub-flows to different gateways of proper locations (edge platform or cloud platform) based on overall topology of the system; (ix) utilizes a centralized workflow engine to configure overall workflow (or all sub-flows); and/or (x) deploys the sub-flows to different gateways of proper locations (edge platform or cloud platform) based on overall topology of the system.

Figure 12:
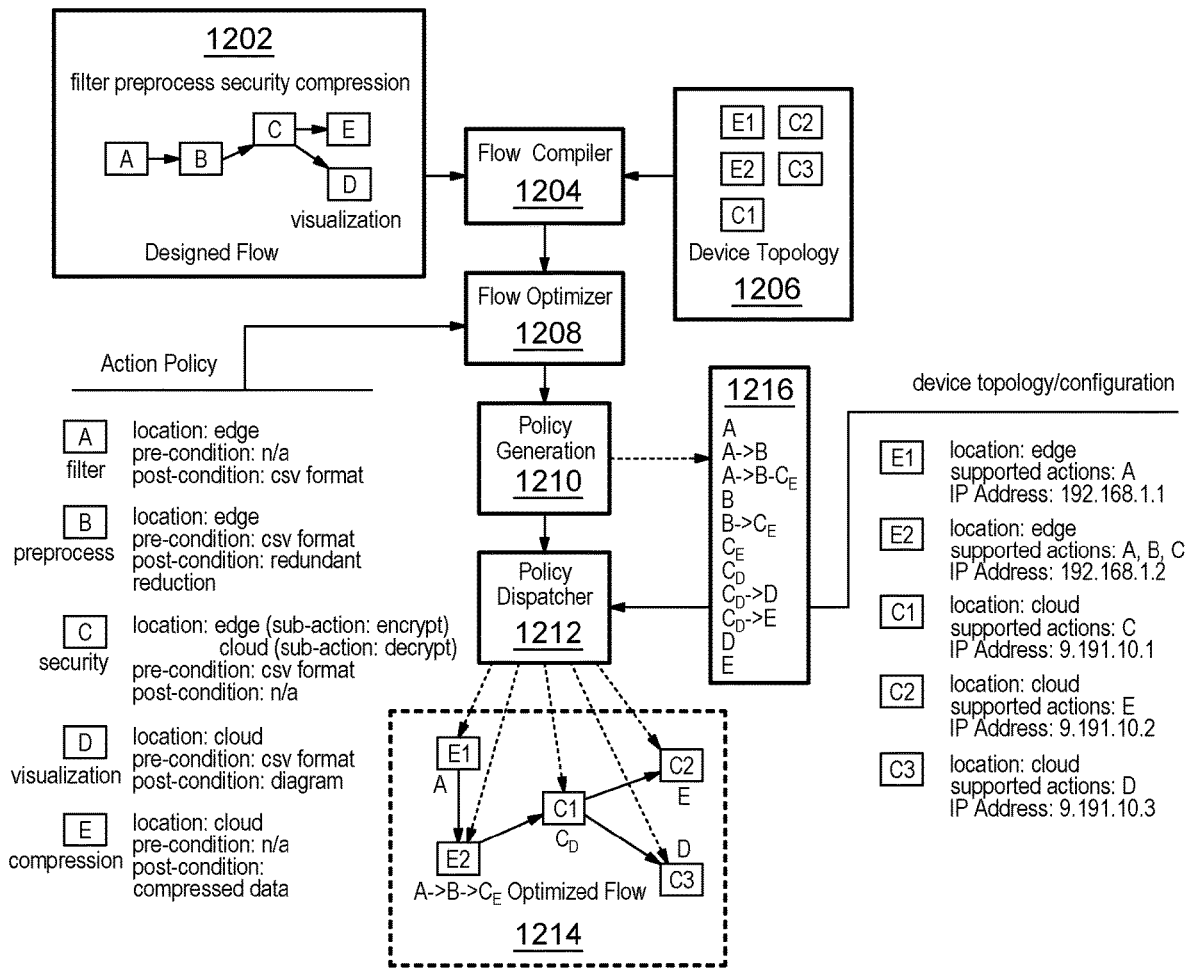
FIG. 12 a flow chart showing a sixth embodiment of a method according to the present invention.

Embodiments of the present invention will now be discussed in reference to FIG. 12. FIG. 12 shows flow diagram 1200 of an overall workflow for a designed workflow. Flow diagram 1200 includes: design flow 1202, which further includes action policies A, B, C, D and E; flow compiler 1204; device topology 1206, which includes nodes E1, E2, C1, C2, and C3; flow optimizer 1208; policy generation 1210; policy dispatcher 1212; optimized flow 1214, which includes nodes E1, E2, C1, C2 and C3; and generated sub-flows 1216, which includes sub-flows A, A to B, A to B to $C_E$, B, B to $C_E$, CE, $C_D$, $C_D$ to D, $C_D$ to E, D and E.

As shown in flow chart 1200 of FIG. 12, when implementing the actions of the workflow shown in design flow 1202, flow compiler 1204 analyzes the action policies of the design flow and uses device topology 1206 as the operating environment for the optimization of an overall workflow. The nodes of device topology 1206 include information such as: (i) location information (such as whether an action policy is located on an edge computer or a cloud computer), (ii) capability information of the edge and cloud computing devices, and (iii) supported action information of the edge and cloud computing devices.

Flow optimizer disassembles the action policies of design flow 1202 and converts these action policies into edge/cloud sub-action policies. For example, for the action policies A, B, C, D and E, a sub-action policy can include: (i) A, B to edge; (ii) C to $C_E$ (where sub-policy action $C_E$ is encrypting data) and $C_D$ (where sub-policy action $C_D$ is decrypting data); and (iii) D, E to cloud.

Policy generation 1210 generates all possible sub-workflows from the design workflow. Once the policy generation generates all possible sub-workflows, policy dispatcher 1212 dispatches certain sub-workflows to the nodes of the device topology (such as E1, E2, C1, C2 and C3) based upon the capabilities and location of the nodes. For example, node E2 is on an edge computer and supports actions A, B and C. Based upon this information of node E2, the policy dispatcher will dispatch the most suitable sub-workflow (such as A to B to $C_E$) to node E2 in order to utilize the availability of node E2. After the dispatch of the most suitable sub-workflow by the policy dispatch is complete, optimized flow 1214 is deployed.

Some embodiments of the present invention may include one, or more, of the following features, characteristics and/or advantages: (i) automatically deploying and configuring IoT gateway workflows (services/operations in the workflow) on edge computing platform and cloud computing platform; (ii) utilizing a centralized workflow engine to configure overall workflow (or all sub-flows); and/or (iii) deploying the sub-flows to different gateways of proper locations (such as edge platform or cloud platform) based on overall topology of the system.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer implemented method (CIM) comprising:
deploying a hybrid Internet of Things (IoT) gateway architecture including a plurality of cloud gateways and a plurality of edge gateways;
configuring, by a user and through a centralized/unified flow engine interface implemented on a centralized IoT gateway flow computer, a set of overall workflow(s) for the hybrid IoT gateway architecture by:
compiling, by the centralized IoT gateway flow computer, the set of overall work flow configuration(s); and
optimizing, by the centralized IoT gateway flow computer, the set of overall work flow configuration(s);
assigning, dynamically and automatically, a set of sub-configuration(s) to create a centralized IoT gateway configuration for processing the set of overall work flow(s);
determining, by a flow optimizer program, that the plurality of cloud gateways is optimized to process a set of decrypt service sub-flows for runtime execution; and determining, by the flow optimizer program, that the plurality of edge gateways is optimized to process a set of encrypt service sub-flows for runtime execution; and deploying, dynamically and automatically, the set of sub-configuration(s) to the plurality of cloud gateways and the plurality of edge gateways causing an encryption service for the set of overall workflow(s) to automatically spread into the set of encrypt services and the set of decrypt services.

2. The CIM of claim 1 wherein the dynamic and automatic assignment of the set of sub-configuration(s) is based on overall topology of the system so that a single centralized IoT gateway flow computer is used to configure all of the cloud gateways and all of the edge gateways in the hybrid IoT gateway architecture.

3. The CIM of claim 1 wherein the configuration of the set of overall workflow(s) includes intelligent configuration distribution.

4. The CIM of claim 1 wherein:
the optimizing is performed intermittently including both the plurality of cloud gateways and the plurality of edge gateways.

5. A computer program product (CPP) comprising:
a machine readable storage device; and
computer code stored on the machine readable storage device, with the computer code including instructions and data for causing a processor(s) set to perform operations including the following:
deploying a hybrid Internet of Things (IoT) gateway architecture including a plurality of cloud gateways and a plurality of edge gateways,
configuring, by a user and through a centralized/unified flow engine interface implemented on a centralized IoT gateway flow computer, a set of overall workflow(s) for the hybrid IoT gateway architecture by:
compiling, by the centralized IoT gateway flow computer, the set of overall work flow configuration(s), and
optimizing, by the centralized IoT gateway flow computer, the set of overall work flow configuration(s),
assigning, dynamically and automatically, a set of sub-configuration(s) to create a centralized IoT gateway configuration for processing the set of overall workflow(s),
determining, by a flow optimizer program, that the plurality of cloud gateways is optimized to process a set of decrypt service sub-flows for runtime execution, and
determining, by the flow optimizer program, that the plurality of edge gateways is optimized to process a set of encrypt service sub-flows for runtime execution, and
deploying, dynamically and automatically, the set of sub-configuration(s) to the plurality of cloud gateways and the plurality of edge gateways causing an encryption service for the set of overall workflow(s) to automatically spread into the set of encrypt services and the set of decrypt services.

6. The CPP of claim 5 wherein the dynamic and automatic assignment of the set of sub-configuration(s) is based on overall topology of the system so that a single centralized IoT gateway flow computer is used to configure all of the cloud gateways and all of the edge gateways in the hybrid IoT gateway architecture.

7. The CPP of claim 5 wherein the configuration of the set of overall workflow(s) includes intelligent configuration distribution.

8. The CPP of claim 5 wherein:
the optimizing is performed intermittently including both the plurality of cloud gateways and the plurality of edge gateways.

9. A computer system (CS) comprising:
a processor(s) set;
a machine readable storage device; and
computer code stored on the machine readable storage device, with the computer code including instructions and data for causing the processor(s) set to perform operations including the following:
deploying a hybrid Internet of Things (IoT) gateway architecture including a plurality of cloud gateways and a plurality of edge gateways,
configuring, by a user and through a centralized/unified flow engine interface implemented on a centralized IoT gateway flow computer, a set of overall workflow(s) for the hybrid IoT gateway architecture by:
compiling, by the centralized IoT gateway flow computer, the set of overall work flow configuration(s); and
optimizing, by the centralized IoT gateway flow computer, the set of overall work flow configuration(s),
assigning, dynamically and automatically, a set of sub-configuration(s) to create a centralized IoT gateway configuration for processing the set of overall workflow(s),
determining, by a flow optimizer program, that the plurality of cloud gateways is optimized to process a set of decrypt service sub-flows for runtime execution, and
determining, by the flow optimizer program, that the plurality of edge gateways is optimized to process a set of encrypt service sub-flows for runtime execution, and
deploying, dynamically and automatically, the set of sub-configuration(s) to the plurality of cloud gateways and the plurality of edge gateways causing an encryption service for the set of overall workflow(s) to automatically spread into the set of encrypt services and the set of decrypt services.

10. The CS of claim 9 wherein the dynamic and automatic assignment of the set of sub-configuration(s) is based on overall topology of the system so that a single centralized IoT gateway flow computer is used to configure all of the cloud gateways and all of the edge gateways in the hybrid IoT gateway architecture.

11. The CS of claim 9 wherein the configuration of the set of overall workflow(s) includes intelligent configuration distribution.

12. The CS of claim 9 wherein:
the optimizing is performed intermittently including both the plurality of cloud gateways and the plurality of edge gateways.

* * * * *